J. C. CLANCY.
PROCESS FOR PURIFYING AND DRYING GASES.
APPLICATION FILED DEC. 31, 1918.
1,403,391.
Patented Jan. 10, 1922.
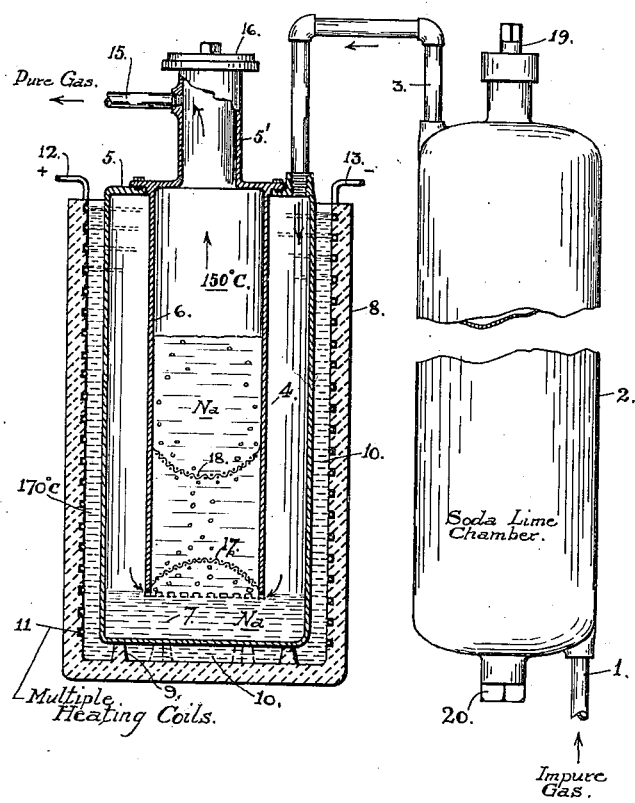

UNITED STATES PATENT OFFICE.

JOHN COLLINS CLANCY, OF NIAGARA FALLS, NEW YORK, ASSIGNOR TO THE NITROGEN CORPORATION, OF PROVIDENCE, RHODE ISLAND, A CORPORATION OF RHODE ISLAND.

PROCESS FOR PURIFYING AND DRYING GASES.

1,403,391.    Specification of Letters Patent.    Patented Jan. 10, 1922.

Application filed December 31, 1918. Serial No. 269,062.

*To all whom it may concern:*

Be it known that I, JOHN COLLINS CLANCY, a subject of the King of Great Britain, residing at Niagara Falls, in the county of Niagara and State of New York, have invented certain new and useful Improvements in Processes for Purifying and Drying Gases, of which the following is a specification.

This invention relates to a process of and means for purifying and drying gases or gaseous mixtures such as are used in processes for synthesizing ammonia from its elements.

In processes of this latter description, it is usually essential that the mixture of, for example, three parts by volume of hydrogen to one of nitrogen, be as free from oxygen and other catalyst impairing impurities, as it is possible to render it.

How best to accomplish this purpose in a reliable and relatively inexpensive manner, is a problem which has for some years past demanded the attention of those skilled in this art. As a result, various attempts have been made to solve the problem; but so far as I am aware, all such efforts have involved relatively bulky and costly drying and purifying systems; and, obviously, in large scale operations, economy of space and cost per unit become of very great importance on account of the large number of units which may be required.

The hereindescribed system is very compact and has proved in practice to be most efficient.

In the accompanying drawing, which forms a part hereof, I have exemplified a preferred form of the apparatus used for the effectuation of my process; but as I am aware of various changes and modifications which may be made in both said process and apparatus, without departing from the spirit of my invention, I desire to be limited only by the scope of the appended claims, broadly interpreted in the light of my disclosure.

The figure in said drawing is an elevation of said apparatus, partly broken away or sectioned vertically on the axis of one of the receptacles, for purposes of illustration.

Referring to said figure: A pipe 1 is therein shown as delivering the gaseous mixture to be treated, to a suitable drum or other container 2, which constitutes a chamber for the reception of a quantity of soda-lime or like material possessing the property of actively absorbing moisture, $CO_2$, $SO_2$, $H_2S$, $NO_2$ and certain other deleterious substances which may be present in the gases to be synthesized.

It may be noted in this connection that soda-lime is not a good absorbent for carbon monoxid, so that if this gas be present, provision should otherwise be made for its elimination from the gas being treated, as by means of, for example, a solution of cuprous chlorid containing ammonium carbonate.

Receptacle 1, in any case, merely contains material for absorbing quite completely the deleterious substance or substances present in the gaseous mixture,—the final purification being effected in the novel manner hereinafter described.

The principal utility of this preliminary purification is to relieve the final purifying apparatus from burden, as far as practicable, in order that but occasional renewals of the purifying material therein may be necessary.

Returning, now, to the drawing,—the gaseous mixture of nitrogen and hydrogen, emerging from the drum 2, passes thence via pipe 3 into a chamber 4 in a gas tight receptacle 5, which preferably has therein an annular wall or septum 6, the bottom edge of which may, if desired, be serrated, as shown.

This edge, when the device is not in operation, is normally immersed in a bath 7 of molten alkali metal, e. g. sodium, or the like,—although, of course, if the temperature of the apparatus be below the melting point of said bath, the latter will congeal around said lower edge.

The receptacle 5 is set into a cylindrical container 8, of glazed earthenware or other suitable material; the walls of container 8 being preferably spaced at substantially all points from those of the receptacle 5. To this end, the latter may be supported by lugs or projections 9, or the like; while the space 10 around the receptacle 5 is preferably filled with a heavy hydrocarbon like paraffin.

The inner wall of the container 8 may be grooved or other suitable provision made to support thereupon electrical heating coils 11; the terminals of which are shown respectively at 12 and 13.

Receptacle 5 is preferably provided with a reduced upper portion 5', which receives the pure gas emerging from the space within the septum 6, and delivers it to a pipe 15.

To permit ready access to chamber 4, the parts 5' and 6 may be made integral, but separable as a unit from the receptacle 5, proper; it being, of course, desirable that gas tight connections be provided to prevent the escape and waste or gases being treated, and, more importantly, to prevent contamination of said gases by free oxygen from the arm. The extension 5' may be similarly closed gas tight by a cap or plug 16.

Within the cylindrical septum 6, I prefer to provide two fine mesh wire screens 17 and 18. These may be of iron wire and that designated 17 is preferably dished or concaved upwardly, while screen 18 is reversely concaved.

The cylinder 2 may be provided with plugs 19 and 20 to afford access to the interior thereof.

The preferred mode of operating the apparatus will now be described.

Assuming that the gas to be purified is a mixture of nitrogen and hydrogen in combining proportions; that is, three parts by volume of hydrogen to one of nitrogen. This gaseous mixture is first passed through the preliminary-treatment cylinder 2, to eliminate very nearly all of the impurities present therein. Indeed, one would be apt to consider that by the time that the gas had passed through a long cylinder full of substantially fresh soda-lime mixture, surely all moisture, for example, should have been removed therefrom; especially when but a trace of such moisture was initially present. I have ascertained as the result of experience, however, that, normally, there will still be left in the gas sufficient oxygen or oxygen containing impurities, such as moisture, to seriously impair the catalyst to which the gases are later delivered for synthesis to ammonia.

When, however, the gases emerging from receptacle 2 are subjected to the following final treatment, they will be found to be so pure that a long life of the catalyst is assured.

It may be here noted that the gaseous mixture to be treated, is preferably under considerable pressure when being purified as herein described; this pressure being, for example, from fifty to two hundred atmospheres. The use of such pressures permits of smaller apparatus than would otherwise be the case, while it seems probable that it also favors purification by the now-to-be-described means.

The paraffin in the space 10 is melted and heated quite uniformly to a temperature of about 170° C., by means of the heating coils 11. Heat is thereby imparted, through the walls of the receptacle 5, to the alkali metal bath 7 in the bottom of said receptacle, to liquefy the sodium or the like, while at the same time maintaining it at a temperature at which it combines with the barest traces of moisture, oxygen, or the like, which may be present in the gases passing through said bath.

The pressure of the gas in chamber 4 depresses the level of the sodium therein until said gas is able to escape past the lower edge of the septum, or, where said edge is serrated, through the small spaced passages thereby provided.

Thus, the gas is forced most intimately into contact with the molten sodium and to still further favor this contact, I provide the screens 17—18. Screen 17 is so shaped, that while minute bubbles of gas may pass therethrough, there is also a tendency to direct the gaseous flow toward the axis of the receptacle; while when the stream of bubbles encounters screen 18, a reverse action occurs and the bubbles are more or less spread apart.

The depression of the liquid in chamber 4, of course elevates it in the space within the septum; so that the bubbles thus pass up, zig-zagging to and fro, through an extended column of hot liquid sodium. By the time that the gas emerges from the alkali metal bath, it may very properly be characterized as pure. The space between the upper level of the sodium and the top of the receptacle, and especially this distance plus the distance from pipe 15 down to the bottom of the extension 5', is such as to insure against any entrainment of sodium along with the gas when the latter passes on its way toward the synthesizing apparatus.

The temperature of the gas emerging from the alkali metal bath preferably approximates 150° C.; and I am of the opinion that, aside from the increased reactivity of the alkali metal resulting from its heated condition,—the gas, per se, better adapts itself to thorough purification by reason of its elevated temperature, since the molecules thereof and, of course, of any impurities present, obviously, are thereby rendered very active and hence tend to travel back and forth through the small bodies of gas which they make up, until, during the course of the extended journey of such bodies in contact with the alkali metal, they each and every one, almost to a certainty, must impinge one or more times against the surface of the metal. The purifying action of the sodium or the like upon the gas to be treated, probably depends upon the intense avidity with which the heated alkali metal combines with any water, free oxygen, or the like, present in said gas.

When water, for example, is the principal impurity to be eliminated, the sodium is gradually converted to sodium hydroxid and after some time, it hence becomes necessary to renew the charge of metallic sodium in the apparatus. The fact that the alkali metal is molten, rather than solid, favors the prolonged use of said charge, as it permits any sodium hydroxid formed, to settle to the bottom of the receptacle, and, normally, out of the path of the gas being treated.

The described temperature of the operation, prevents volatilization of any sodium hydrate formed, since the temperature of the purifying bath, when sodium is the alkali metal employed, is preferably never permitted to exceed 170° C., while the boiling point of sodium hydroxid is 318° C. Volatilization of the sodium, at the temperature and pressure used, is of course impossible.

If sodium oxid, $Na_2O$, is formed, this also settles to the bottom of the molten sodium bath, the melting point of this substance being much higher, again, than the hydroxid.

Any sodium carbonate, sulfid, chlorid or iodide formed, behave similarly and are furthermore readily eliminated from the gas being treated, on account of the extreme ease with which chlorin, sulfur, etc., combine with the hot alkali metal.

It will hence be seen that the described treatment is practically ideal for the purpose in question; and, since, the bulk of the impurities are eliminated from the gas by the preliminary treatment, normally, indeed, so that but mere traces of said impurities remain, the treatment is relatively inexpensive.

Potassium is even more active chemically than sodium but is more expensive, and, since sodium affords results which are eminently satisfactory, this material is preferred.

It is barely possible that some sodium hydrid, NaH, is formed; but, in practice, if this substance is present at all, it is unstable under the prescribed conditions and in any case seems in no way to affect the operation deleteriously.

I desire to point out that while, when the purified gas is intended for use in the synthesis of ammonia from its elements, it preferably consists of a mixture of nitrogen and hydrogen,—this is by no means essential, since either or both of these gases may be separately purified in the manner herein described, and the mixture subsequently formed, if it be desired to use such a mixture. This observation seems necessary, because ammonia is not in all cases synthesized from a mixture of its elements in gaseous form; since, for example, a metallic nitrid, hydrid or even a cyanid or the like, may first be formed from nitrogen or hydrogen (as the case may be) prepared as per the present disclosure, and the nitrogen of such a nitrid or cyanid, may then be combined with hydrogen, or the hydrogen of the hydrid may similarly be combined with nitrogen, to form ammonia, or the like, as desired.

It has been found that certain of the most efficient catalysts employed in effecting the synthesis of ammonia from its elements, are extremely sensitive to even very slight traces of oxygen, or oxygen compounds, such as water, CO and the like; traces of such oxygen bearing compounds or material, behaving as slow poisons, which are, moreover, cumulative. Oxygen attacks the catalyst molecule by molecule, so to speak, and in proportion to the content of such poisonous material in the gases flowing over or through the catalyst, the life of the latter is shortened.

Hence, in such case, it is imperative to abstract from the gas or gases to be synthesized, substantially every trace of oxygen bearing material.

It has been found as the result of extensive experimentation that the hereindescribed process actually does so nearly eliminate the deleterious matter as to permit of the continued operation of highly sensitive and extremely active catalytic masses for relatively extended periods, which make the ammonia synthesizing operation commercially practicable.

In this connection, I wish to emphasize the value of treating the gas or gases in the manner described in the foregoing; especially bearing in mind the importance of effecting the desired purification while the gas, being treated, is under at least relatively high pressure.

To effect the requisite practically complete purification of the gas, it obviously cannot be permitted to flow through the alkali metal bath at an excessive speed or rate of flow, unless the bath be of impracticably large dimensions. In a large plant, where the ammonia synthesis is effected at, say 100 atmospheres pressure,—a given quantity of the gas which traverses the catalyst per minute at that pressure, would, of course, occupy a volume 100 times as great if the pressure were but that of the atmosphere; and in order to pass such a great volume of gas through a purifying apparatus of commercially practicable size, it would ordinarily have to flow at a rate of speed which would be unduly high for the effectuation of proper purification.

For this reason, the importance of maintaining the gas under a relatively high pressure, during its treatment for purification, at once becomes apparent; and this, aside from the attendant advantages already noted in the foregoing.

That one cannot employ the hereindescribed process for the purification of oxygen or the haloids, is, of course, self evident.

Finally, I wish to point out a further and quite valuable advantage which resides in the described means for equably heating the alkali metal; namely, that the paraffin or like material which constitutes the preferred heat distributing bath, tends to smoke or give off odoriferous vapors when the temperature of this bath becomes undesirably high for the purifying operation and, hence, serves as a warning or indication to the operator which he cannot well neglect.

Having thus described my invention, what I claim is:

1. The process of purifying a gas adapted for use in the synthesis of ammonia, which comprises, subjecting the gas to an initial treatment to remove the bulk of impurities therefrom, and then bringing said gas into contact with an alkali metal under a pressure of approximately 50 atmospheres and at an elevated temperature to further purify said gas.

2. The process of purifying a gas adapted for use in the synthesis of ammonia, which comprises, subjecting the gas to an initial treatment to remove the bulk of impurities therefrom, and then bringing said gas into contact with an alkali metal under a pressure in excess of fifty atmospheres and at a temperature in excess of 100° C. to further purify said gas.

3. The process of purifying a gas adapted for use in the synthesis of ammonia, which comprises, subjecting the gas to an initial treatment to remove the bulk of impurities therefrom, and then bringing said gas into contact with an alkali metal under a pressure in excess of fifty atmospheres to further purify said gas.

4. The process of purifying a gas adapted for use in ammonia synthesis, which comprises, subjecting the gas to an initial treatment to remove the bulk of impurities therefrom, and then bringing said gas into contact with an alkali metal under a pressure and at a temperature sufficient to effect purification of the gas while preventing volatilization of the products formed as a result of the purifying operation.

5. The process of purifying a gas, which comprises, passing the gas through a molten alkali metal under pressure, and at a temperature adapted to facilitate the removal of impurities therefrom while preventing vaporization of the products formed from the reaction between the gaseous impurities and the alkali metal.

In testimony whereof I have affixed my signature, in the presence of two witnesses.

JOHN COLLINS CLANCY.

Witnesses:
ROGER N. LOBDELL,
HOWARD F. HYLAND.